United States Patent [19]
Johnson

[11] 3,793,770
[45] Feb. 26, 1974

[54] WORM ROD

[76] Inventor: George Johnson, 606 S. High St., Galena, Ill. 61036

[22] Filed: Nov. 1, 1972

[21] Appl. No.: 302,765

[52] U.S. Cl. .................................. 47/1.3, 231/2 E
[51] Int. Cl. ........................................... A01m 19/00
[58] Field of Search.... 219/437; 47/1.3; 174/11 BH; 128/215; 231/2 E

[56] References Cited
UNITED STATES PATENTS

| | | | |
|---|---|---|---|
| 1,932,237 | 10/1933 | Warner | 47/1.3 |
| 3,064,113 | 11/1962 | Pitrone | 219/437 |
| 3,343,153 | 9/1967 | Waehner | 174/11 BH |
| 2,450,597 | 10/1948 | Karnowski | 47/1.3 |
| 2,770,075 | 11/1956 | Moore | 47/1.3 |
| 3,134,380 | 5/1964 | Armad | 128/215 |

Primary Examiner—Robert E. Bagwill

[57] ABSTRACT

An improved worm rod for forcing worms and insects out of moist ground thru insertion of the rod into the ground or soil and electric current passing thru the rod into the ground, a rigid straight rod of good electrical conductivity such as aluminum, brass or copper. One end of the worm rod is a hard and high impact handle made of plastic with excellent electrical insulating properties. An indicator bulb that signals the user the rod is functioning properly is provided for in the handle. Means for electrical and mechanical connections are provided. A thin flexible and collapsible cylindrical plastic shield for the electrical rod to safeguard the user from accidently coming in contact with the live electrical rod is also provided.

4 Claims, 5 Drawing Figures

PATENTED FEB 26 1974 3,793,770
FIG. 1 FIG. 2
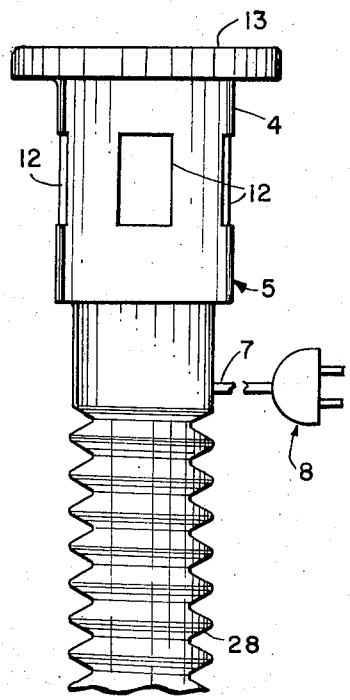
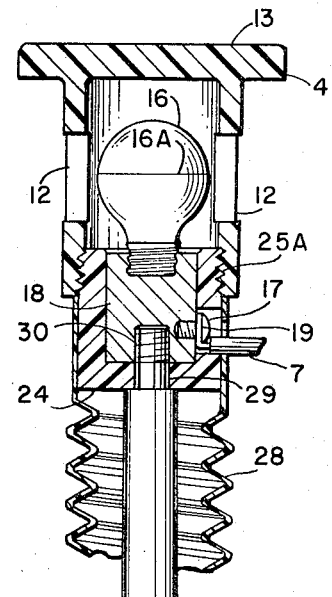
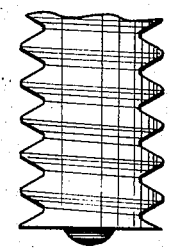
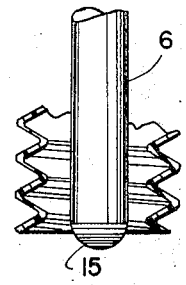
FIG. 3 FIG. 4 FIG. 5
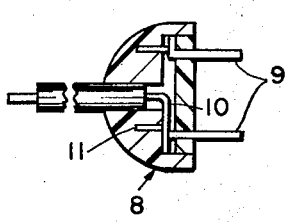
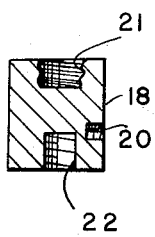
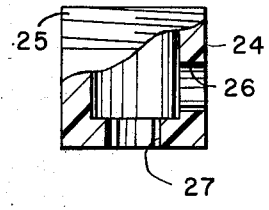

WORM ROD

BACKGROUND OF THE INVENTION

1. FIELD OF INVENTION

The present invention relates to a simple electrical-mechanical device for forcing worms and insects out of moist or damp ground and thus facilitate easy picking. Hence, the back-breaking chore of digging for worms and insects and the uncertainty of locating where to dig are avoided.

2. DESCRIPTION OF PRIOR ART

The very few devices available and very seldom employed, similar to the worm rod, are not as effective, convenient and safe. On one such device, the user or operator can not positively know if the device he is using is operating properly. Another similar device makes use of two rods plus a few accessories for proper hook-up before it can be operative.

SUMMARY OF INVENTION

It is one object of the invention to provide an inexpensive, effective and safe mechanical-electrical device for forcing worms and insects out of moist or damp ground for easy picking.

It is sometimes, if not often, frustrating for a person wanting to go fishing, not being able to conveniently gather the baits he needs. It is also quite discouraging for a person desiring to enjoy fishing to spend much time and effort digging for his baits. It is for these reasons and other obvious reasons that the present invention materialized. Further objects and advantages may be better understood with reference to the following description of an embodiment of the invention illustrated in the accompanying drawing.

BRIEF DESCRIPTION OF DRAWINGS

FIG. 1 is a side elevation.

FIG. 2 is a vertical longitudinal view of FIG. 1.

FIG. 3 is a cross section of the electrical male plug showing electrical wire connections.

FIG. 4 is a cross section of the threaded electrical conductor where electric current is fed to the electrical rod and the indicator light bulb.

FIG. 5 is a longitudinal section of the bottom plastic insulator which houses the part shown in FIG. 3.

DESCRIPTION OF EMBODIMENT

Refering now more particularly to the drawings, therein is illustrated a new and improved worm rod 5. The worm rod 5 includes a hollow plastic dielectric handle 4 of reasonable length to accomodate cross width of the palm of a hand. The handle 4 has a plurality of rectangular openings or windows 12. The larger top portion 13 of the handle 4 is to provide a large enough area for the palm of the hand during insertion of the electrical rod 6 into the ground.

The windows 12 are actually sight windows for the indicator light bulb 16. Sight windows 12 are provided to permit the operator to detect the glow of the bulb 16 in any peripheral position turning three hundred sixty degrees. The inside diameter of the handle 4 is larger than the diameter of the bulb 16 measured at the line 16 A. The handle 4 also acts as the housing for the bulb 16.

The bottom portion of handle 4 contains female threads 25A that accepts the male threads 25 of the bottom hollow plastic housing 24. The housing 24 is also of a dielectric, strong and rigid plastic material. Said housing 24 has a center thru hole 27 at the closed end. The diameter of the hole 27 is smaller than the larger diameter of the rod 6 but fits the necked-down diameter 29 being the major diameter of the threaded end 30 of the rod 6. The housing 24 also has side hole large enough to work in the screw head of screw 17 and the electric cord 7. The bare wire 19 is looped around once over the screw 17 and the screw 17 is tightened.

The flexible electric cord 7 is of sufficient length and is provided with a male electrical plug 8. Note that only one wire 10 is connected to one of the prongs 9 at the prong connections 11.

The wire 10 is a continuous wire length the other end of which is looped around the screw 17. The said looped wire is designated by the numeral 19.

The threaded holes in electrical conductor 18 contains a female thread 22 to receive male threads 30 of rod 6. The opposite end of the conductor 18 is female rolled threads 21 to accept the male threads of the indicator light bulb 16. The conductor 18 also contains a female screw thread 20 located on the peripheral side.

The electric rod 6 has a spherical point 15 at one end. This will facilitate easy insertion into the ground.

A suitable, thin, flexible and collapsible, dielectric plastic cylinder 28 provides safety cover for the whole length of rod 6. The cover 28 emanates from and is reasonably securely attached to the outside cylindrical surface of housing 24. Said cover 28 eliminates the danger of the user accidentally coming in contact with the electrically live rod 6.

Referring now to the arrangements shown in FIG. 2, when the male plug 8 is plugged into a household or convenient outlet and one of the prongs 9 where the wire is connected, is in contact with the electrically hot or live side of the said outlet, electric current will travel the wire 10 to the screw 17. From the screw 17, the current will pass thru 18 to the rod 6. The said electric current in 18 will also cause the bulb 16 to glow. Said glowing of the bulb 16 indicates to the user the worm rod is functioning. If the rod 6 is now inserted into moist ground or soil, current will branch out in all directions from the cylindrical surface of the rod 6 into the ground. Said small branches of current will only be pronounced in the near vicinity of the rod 6. This phenomenon forces the worms and insects to the surface of the ground and thus permits their easy picking. In the process of inserting the rod 6 into the ground, the plastic cover 28 will collapse upward being forced by the ground surface at one end while retained at the housing 24 at the other end. Said cover 28 never penetrates the ground surface.

What is claimed as needed and desired to be secured by letters patent is:

1. An electrically operated worm rod intended to effect the surfacing of worms and insects out of the ground, comprising a cylindrical housing member formed of electrical insulating material and having a top surface, a bottom surface, and depending cylindrical side wall surfaces, a cylindrical bore formed concentric with the housing member and extending partially axially therethrough and opening out of the top surface thereof, an aperture disposed concentrically in the housing member bottom surface and extending axially completely therethrough interconnecting the bottom surface to the bore, the circumferal surface of the top portions of the side wall adjacent the top surface having a spiral screw type thread formed integrally therein and extending completely therearound, a handle member formed of electrical insulating material and including a hollow cylindrical portion open at the bottom end thereof and closed at the top end thereof by an enlarged disc shaped head portion of a diameter greater than the diameter of the cylindrical portion and adapted to be readily grasped in the palm of an individual's hand in a manner to apply pressure thereagainst, a plurality of window like openings spaced about the circumference of the side walls of the cylindrical member and extending completely therethrough for visibility into the interior of the cylindrical member, the open end of the cylindrical member having formed interiorly thereof a spiral screw thread of a size and pitch complementary to the size and pitch of the threads on the housing member and adapted to be threadedly engaged thereon to retain the cylindrical member in axial alignment with the housing member and projecting outwardly of the top surface of the housing member with the window like openings projecting upwardly beyond the top surface of the housing member, a cylindrical electrical conducting member of a diameter substantially equal to the diameter of the cylindrical bore and of a depth substantially equal to the depth of the cylindrical bore and adapted to be snugly received therein, the conducting member having a top surface, a bottom surface, and depending cylindrical side wall surfaces, the conducting member bottom surface having an internally threaded cylindrical bore disposed inwardly thereof of a diameter substantially equal to the diameter of the aperture extending through the housing bottom surface and in axial alignment therewith, an electric lamp having a threaded screw type base, an internally threaded cylindrical socket formed inwardly of the top surface of the conducting member and adapted to threadedly receive the base of the electric lamp therein, a source of electrical energy, means adapted to interconnect the conducting member to the source of electrical energy, an elongated electrical conducting rod formed of an electrical conducting material and having a top end portion having threads thereon adapted to be threadedly received in a retaining manner in the bore opening out of the bottom surface of the conducting member, the rod projecting concentric with the conducting member and housing member outwardly of the housing member bottom surface and terminating in a hemi-spherical point, and a hollow elongated cylindrical member having corrugated accordion like side wall surfaces with the top end portion secured to the housing member and the bottom end portion extending freely therefrom with the side walls completely surrounding the electrical rod and terminating substantially adjacent the point of the rod in a manner to provide an electrical insulating barrier about the rod which in the inoperative position of the rod extends completely around the rod to prevent inadvertent contact therewith by an individual or the like, and when the rod is inserted into the ground the insulating cylinder collapses onto itself in an accordion like manner adjacent the bottom portions of the housing member to permit the rod to penetrate the ground while still protecting the portion of the rod immediately above the ground from inadvertent contact by the body of an individual or the like.

2. The worm rod as set forth in claim 1 wherein the electrical connecting means includes an aperture extending radially through the side wall of the housing member interconnecting the bore with the exterior surface of the housing member, a threaded radially extending opening disposed in the conducting member side wall in a position oriented with the housing member side wall opening, a screw member having an enlarged head portion and a shank portion adapted to be threadedly received in the threaded opening in the conducting member, a flexible suitably insulated electric cord having one end connected intermediate the enlarged screw head portion and the conducting member side wall with the cord extending outwardly therefrom and terminating in an electrical plug adapted to be inserted into a conventional housing receptacle, the socket having the conventional set of two prongs projecting outwardly therefrom adapted to engage the conventional household receptacle, the end of the electrical cord within the socket being electrically connected to only one of the projecting prongs in a manner to engage only the ungrounded side of the electrical household circuit comprising said source of electrical energy such that when the plug is properly inserted into the receptacle to engage the electrical wire with the ungrounded portion of the receptacle the lamp in the handle member will glow and be visible through the windows disposed about the housing member to indicate that the electrical rod is energized and prepared for intended usage.

3. The worm rod as set forth in claim 2 wherein the top end portion of the collapsible hollow insulating cylinder member is of a diameter to be snugly received about the side walls of the housing member in a telescoping manner to retain the insulating cylinder in operative position thereon.

4. The worm rod as set forth in claim 3 wherein the top end of the electrical rod includes a concentric elongated cylindrical shank extending axially outwardly therefrom of a diameter less than the diameter of the rod and adapted to extend through the opening of the housing member bottom surface and be threadedly received in the threaded opening disposed in the conducting member bottom surface, the position of joining of the reduced diameter shank with the remaining portion of the electric rod forming an annular shoulder thereabout adapted to engage the underneath exterior surface of the bottom surface of the housing member in a manner to compress the bottom surface of the housing member intermediate the electrical rod and the conducting member to retain such components in respective assembled positions.

* * * * *